M. D. Fogel
Bee Hive

No. 74,810  Patented Feb. 25, 1868.

Witnesses
Andrew Brown
William Wardell

Inventor
M. D. Fogel

United States Patent Office.

MATHIAS D. FOGEL, OF ALPHA, OHIO.

Letters Patent No. 74,810, dated February 25, 1868.

IMPROVEMENT IN BEE-HIVE.

The Schedule referred to in these Letters Patent and making part of the same.

Be it known that I, MATHIAS D. FOGEL, of Alpha, in the county of Greene, in the State of Ohio, have invented a new and improved "Bee-Hive;" and I hereby declare that the following is a full, clear, and exact description thereof, reference being had to accompanying drawings making a part of this specification, in which—

Figure 1:
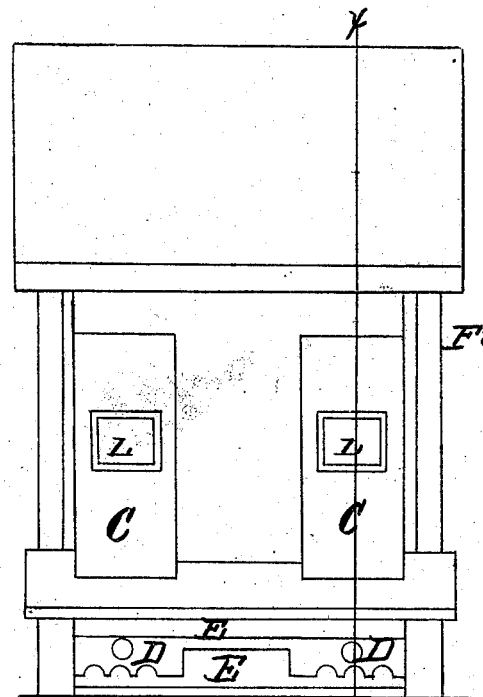

Figure 1 is a front elevation.

Figure 2:
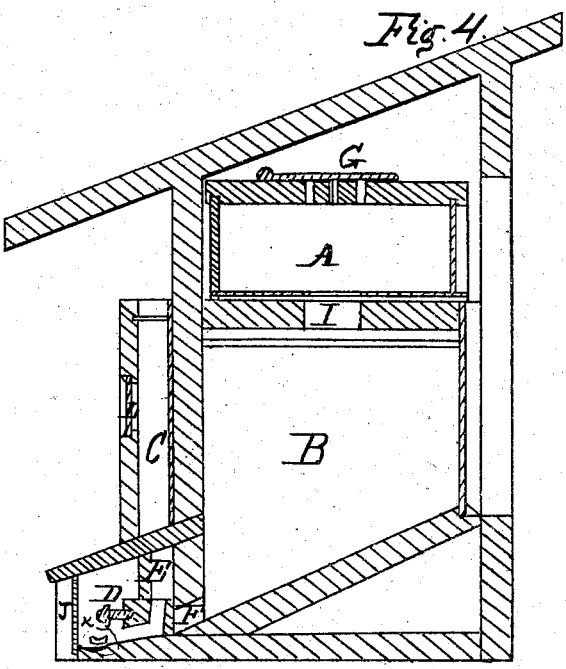

Figure 2, a rear elevation.

Figure 3:
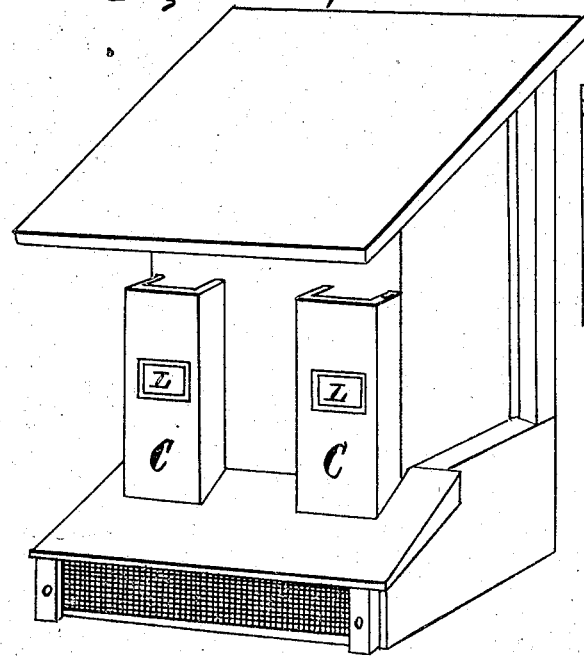

Figure 3, a perspective elevation; and

Figure 4:
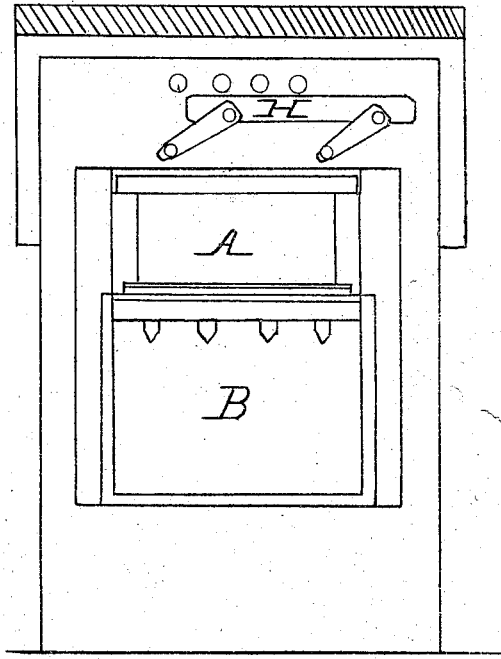

Figure 4 a vertical or longitudinal section, taken in the line $x\ x$, fig. 1.

The nature of my invention consists in providing the upper part of a bee-hive with sufficient ventilation, which I do by ventilator G, which is a board placed on the top of the honey-box A, (which top is pierced with several holes,) fastened on one end by a pivot, $y$, so that it can be slid on or off to let the foul and hot air escape in the winter season, for if it does not escape it will rise and freeze in the top of the hive, and when it thaws will drown the bees or mould the comb.

I also provide the hive with a slanting bottom, W, it being easier for them to get the dirt out with a slanted bottom than a flat one. I also place a wire screen, J, at the portico, as shown in fig. 3 or in fig. 4, to close up the hive in snowy seasons, so that the bees cannot get out and perish in the snow. To supply the bees with water, I place a trough, K, inside this screen, from which they drink and return to their room. I also place at the entrance, F, a block, D, at each corner, with notches, N N, in the under side, and a hole, O, through the block D, communicating with the miller-chambers C, which are directly over these blocks. The backs of these chambers are made of tin, P. When hiving, the blocks should be removed, and afterwards replaced. The millers fly and dart round about the hive in the evening, and will try to get out of the way of the bees; thus they slip around in corners, and will soon find a place to hide in under these blocks. Immediately on entering the holes of the blocks they come in contact with the light, L, and will crawl up into the chambers C, where they can be seen on the glass L, and whenever it is desired to remove them draw the screw Q, that fastens the chamber to the hive, take it off carefully, and catch them.

To enable others to make and use my hive, I will proceed to describe its size and construction.

The hive is two feet in height, slanting; the top, R, six inches from back Y to front S, leaving the front S eighteen inches high. It is fifteen inches wide and thirteen inches deep from back Y to front S, which leaves the bees' winter-room, B, fourteen inches deep from back to front, by thirteen inches wide. The honey-box A, which is composed of wood, and provided with a glass in the back, Z, and a tin bottom, is thirteen inches deep, twelve inches wide, and six inches high. The top of this box has several small holes, and over these is placed the ventilator G. To feed the bees, place the food in the honey-box, where they are accustomed to go, and they will find it. The bottom, U, of the hive, in fig. 4, which forms the lower part of the room B, is slanted from five to seven inches, and at the back, Y, in fig. 3, is an upright piece, W, from the base to the top, R, three inches wide, projecting one inch at the back to receive the door. At the rear, the end of the bottom, U, is elevated half an inch higher than the top of the base, X, and at the front this base is bevelled to three inches, to form the portico, as shown. The centre-board T, which forms the upper part of the room B, is ten inches from the top of the hive, with three or four strips, $m\ m$, on the under side for the bees to fasten their comb to, with one hole, I, through it, on each side, in the centre of the hive, one inch wide by two inches long, for the bees to get to the honey-box A.

Having thus described my invention, what I claim as new, and desire to secure by Letters Patent, is—

The within-described hive, when its several parts, exclusive of the trough, are constructed, combined, and arranged as set forth.

MATHIAS D. FOGEL.

Witnesses:
JACOB HARRIS,
FRANCES HARRIS.